Patented June 14, 1927.

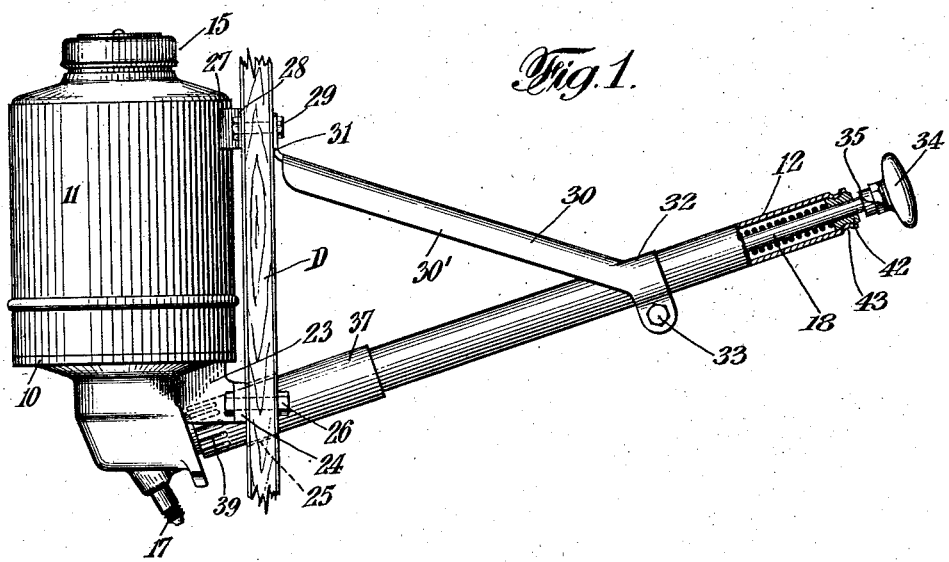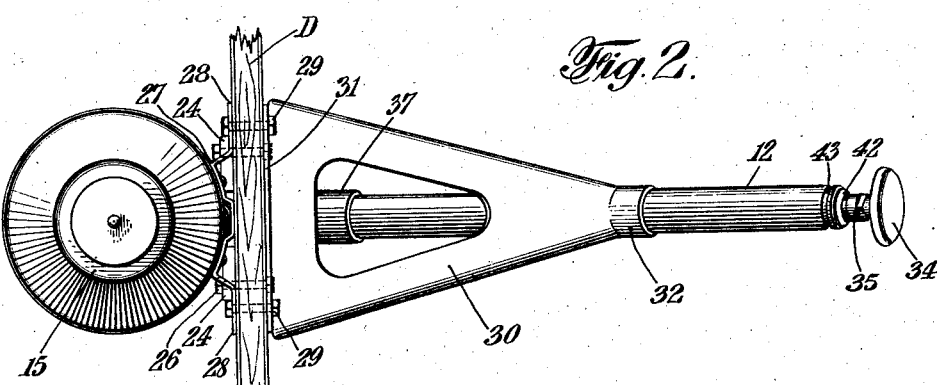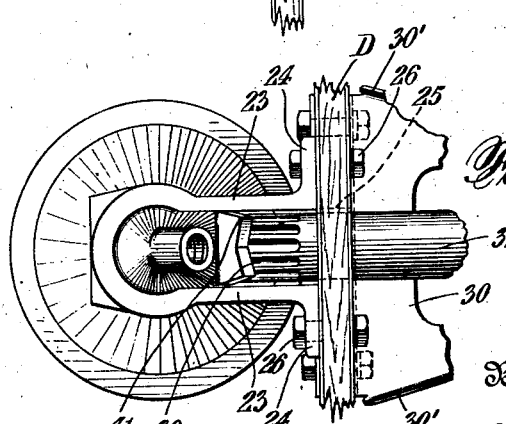

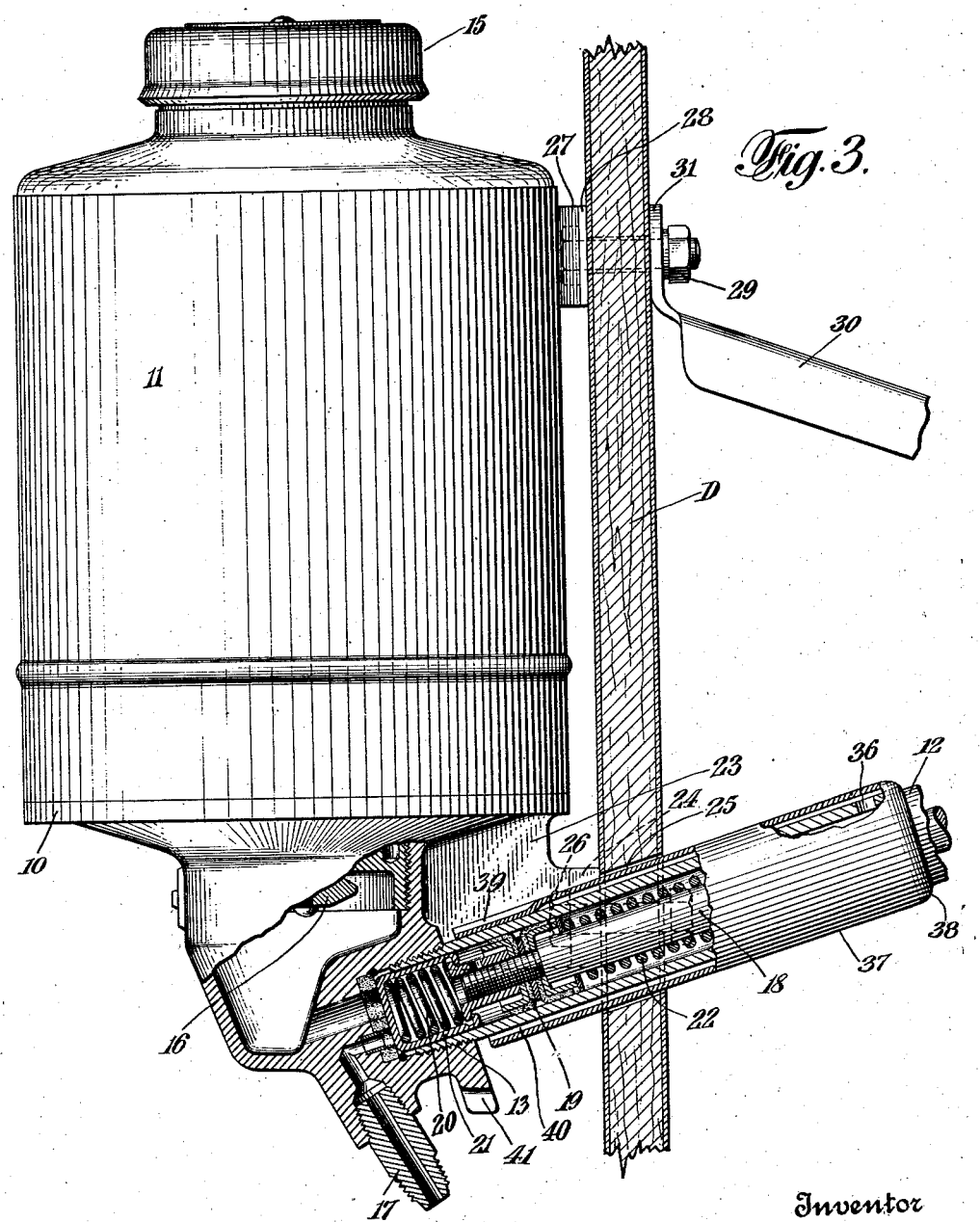

1,632,776

UNITED STATES PATENT OFFICE.

JOSEPH BIJUR, OF NEW YORK, N. Y., ASSIGNOR TO AUTO RESEARCH CORPORATION, A CORPORATION OF DELAWARE.

SUPPLY INSTALLATION FOR CENTRAL CHASSIS LUBRICATION.

Original application filed August 26, 1926, Serial No. 131,640. Divided and this application filed April 9, 1927. Serial No. 182,362.

My present invention relates primarily to chassis lubrication and is more particularly concerned with the arrangement for mounting or applying a source of lubricant and of pressure, upon the motor vehicle.

While the invention is of wider utility, it is more especially concerned with the installation or application of a reservoir and pump assembly of the general type claimed in my copending application, Serial No. 131,640 filed August 26, 1926, of which the present application is a division, that is, with the constructional features of, and associated with said assembly, that are concerned with the installation or mounting, rather than with the functioning or operation thereof.

It is an object of the invention to provide a mounting arrangement for an installation of the above type by which the latter may be conveniently and securely applied at the dashboard or other wall of the driver's compartment without the exercise of skill in aligning or adjusting the parts.

Another object is to provide a mounting arrangement of the character referred to, which, without the addition of parts of considerable weight or bulk, shall yet afford an installed construction, rugged and secure, at the parts that carry the weight, or that sustain the thrust of the pump in operation.

Preferably the pre-assembled reservoir and pump are applied by passing the operating end of the pump through a corresponding aperture in the dashboard from the engine side thereof, the lower part of the assembled structure being formed or provided with an appropriate flange secured against the dashboard. The pump operating knob, which may be of diameter larger than the aperture in the dashboard, is affixed to the outer end of the pump piston, to complete the installation, after the reservoir has been secured in place.

In a preferred construction, in which a substantial length of the pump cylinder structure extends rearward from the dashboard, into the driver's compartment, the outer part of said structure is steadied by means of a bracket, which is anchored to the driver's compartment. In a specific embodiment, the bracket has a wider base secured to the dashboard by fasteners that serve simultaneously for steadying the upper part of the reservoir, the rear of said bracket sustaining the outboard end of the pump structure.

In the accompanying drawings in which is shown one of various possible embodiments of the several features of the invention, Fig. 1 is a side view of the complete installation mounted on a dashboard, parts being shown in section, Fig. 2 is a top plan view of the installation, Fig. 3 is a fragmentary view similar to Fig. 1 on a larger scale, with parts broken away to disclose interior construction, and;

Fig. 4 is a bottom plan view of the reservoir.

Referring now to the drawings, I have shown a lubricant reservoir and pump assembly, preferably comprising a rugged cast element or bottom 10 for the reservoir, the side wall 11 of which may be made of sheet metal. The cast bottom 10 accommodates the base of a pump cylinder 12, preferably a length of pipe secured by screwing at 13 into a corresponding socket in the cast bottom 10, and extending obliquely upward therefrom.

The detailed construction of the reservoir and pump per se and in combination, constituting the subject-matter of the copending parent application, above identified, are not material to the invention claimed herein and are, therefore, not fully described.

It may be briefly noted, however, that the reservoir includes a filling cap 15 and has a check valve 16, preferably in the cast bottom structure 10, which valve is seated during pump discharge and prevents return flow to the reservoir, so that the oil is forced out in pump discharge, into the pipe line (not shown) by way of the outlet nipple 17 in the bottom of the reservoir.

The pump comprises a piston rod 18 having a piston cup structure 19 at the end thereof and a buffer structure including a spring 20 enclosed in a thimble 21 and urged by the coil spring 22 to normally close preferably both the inlet to and the outlet from the pump.

The reservoir and pump combination is mounted preferably upon the dashboard of an automobile in a manner now to be described. For this purpose, the cast bottom 10 is formed integral with a pair of webs 23 having feet 24 determining a mounting flange. The dashboard D is provided with an aperture 25 of diameter but little larger than that of the pump cylinder, so that the pump and reservoir combination may be applied to the dashboard by passing the pump cylinder through aperture 25 from the engine side of the dashboard, until the mounting flange 24 comes into face contact with the dashboard. The flange is then clamped tight against the dashboard by bolts and nuts 26 passed through the dashboard and clamping the mounting feet in position thereagainst.

While the attachment described is generally sufficient, it may be desirable to steady the upper end of the reservoir by additional securing means. For this purpose, a strap 27 is soldered to the outside of the reservoir and has laterally extending ears 28 which are clamped against the dashboard by bolts and nuts 29 therethrough.

The pump cylinder structure 12 being preferably of substantial length and small diameter protrudes for a substantial length into the driver's compartment under the instrument board (not shown). In order to steady the outer end of said cylinder, a bracket is preferably provided which is secured to some fixed part of the driver's compartment. In the preferred embodiment shown, the bracket comprises a generally triangular stamping 30 having a ledge 31 at its wider end or base secured against the driver's side of the dashboard, preferably by the same bolts 29, which serve for attachment of the strap 27 of the reservoir. The forward or apex end of the bracket is formed as a strap 32 encircling the outboard end of the pump cylinder, and clamped thereabout by bolt 33. The sides of the bracket 30 are provided with downturned ledges 30' which stiffen the same to resist sway of the pump cylinder in a vertical plane, while the main web of the bracket affords considerable stiffness in the plane thereof to resist lateral sway of the cylinder.

It is desired to provide a pump operating knob 34 of relatively large diameter for convenience of operation, but such knob could not be passed through the small dashboard aperture 25. Accordingly, the knob is left off the pump prior to installing the same upon the dashboard, the entire length of the pump cylinder without the knob being of smaller diameter than aperture 25. After the installation is complete, the knob can then be applied upon the free end of the pump piston rod and secured in position by means of a locked washer 35.

To avoid dripping of oil into the driver's compartment from the reservoir or the wetting of the pump handle or exposed length of cylinder, with oil leaked past the pump piston, I direct such oil to drain from the engine side of the dashboard. In a preferred embodiment, the pump cylinder is provided with one or more outlets in advance of the pump piston, illustratively shown as apertures 36 immediately beyond the outermost extremity of the pump piston structure. A sheet metal drain sleeve 37 of diameter larger than that of the pump cylinder encircles the same and is inturned at its upper end at 38 immediately beyond the drain apertures, into snug engagement with said cylinder. The inner end of the drain sleeve is securely affixed to the pump by longitudinal ribs 39 embossed inward thereupon, affording passage 40 therebetween, through which the leaking lubricant will escape from in front of the dashboard.

Any lubricant thus draining from in front of the dashboard, if allowed to flow toward, and to wet the nipple 17 which supplies the pipe line (not shown) might create the mistaken impression that there is a leak at the threads of said nipple. Accordingly, the support base 10 immediately below the outlet end of the drain sleeve 37 has a structure with one or more drip points 41 from which the oil leaking from the drain sleeve and spreading along casting 10 will drip off, before it can reach the nipple 17. Preferably the drip points 41 are conformed as a bifurcated structure straddling the pipe line, so that the leaking oil will not wet the latter.

Inasmuch as the drain arrangement described, precludes the escape of lubricant from the operating head of the pump, I dispense with the need for a packing or gland at the outer end of the pump. Such packing or glands not only add expense, but induce large and irregular friction resistance, thereby impairing the ease and regularity of pump operation. Accordingly, I provide merely a solid metal button 42 as the head of the cylinder, snugly surrounding the piston rod and held in place by indentations or a peripheral groove 43 about the outer end of the cylinder.

The arrangement for draining lubricant that has leaked past the pump piston is not claimed herein, either alone, or in combination with the arrangement for mounting the pump installation in position; my divisional application Serial No. 193,090, filed May 21, 1927, being directed to that subject matter.

It will be seen that the installation is readily affixed to the dashboard, and that in use, the single rugged mounting casting 10 supports the entire weight of the reservoir and of its contents and takes the thrust exerted in pump operation. The casting being securely mounted directly against the dashboard, leverage tending to loosen the same, is avoided.

I claim:—

1. A supply installation for a chassis lubricating system, comprising a reservoir, a pump associated in a unitary structure therewith and deriving its charge therefrom, a common support for said reservoir and pump, affixed directly to said dashboard said pump having a cylinder structure protruding through and with the major part of the length thereof extending rearward from the dashboard, and a bracket supporting the outboard part of said structure.

2. In a chassis lubricating installation, a reservoir having a laterally extending pump cylinder structure combined in a unitary assembly therewith, said assembly including a rugged supporting part secured to the dashboard and sustaining stresses on the pump, the major length of the pump cylinder structure extending rearward of the dashboard, and an auxiliary bracket for steadying the outboard part of said structure.

3. A supply installation for a chassis lubricating system comprising a lubricant retaining casting provided with a flat flange for disposal against a dashboard, attachment-members securing said flange to said dashboard, a reservoir wall of lighter construction mounted upon said casting, a pump operating handle protruding through said dashboard and having a piston arranged to eject lubricant through an outlet port in said casting, said casting sustaining the weight and taking the thrust imparted both in the charging and in the ejection of the pump.

4. A chassis lubricating installation comprising a reservoir and pump assembly, said assembly including a supporting element adapted to be secured against the dashboard with the reservoir wall extending thereabove and with a pump cylinder affixed at said supporting element with a substantial portion of the length thereof protruding through and substantially closing a corresponding aperture in the dashboard, a piston rod in said cylinder and a handle knob of larger diameter than said aperture adapted to be fixed upon the protruding end of the piston rod, after the otherwise preassembled installation has been mounted in place on the dashboard.

5. A chassis lubricating installation comprising a dashboard, a pump and reservoir assembly including a casting having a flange and bolts securing the same against the engine side of the dashboard, a reservoir wall extending thereabove, a pump cylinder mounted in said casting and extending obliquely upwardly therefrom at the driver's side of the dashboard, a sustaining bracket for the outboard end of said pump, said bracket comprising a sheet metal piece secured to the dashboard at its base and extending obliquely downward from said dashboard and having a strap part clamped about the outboard end of the pump cylinder.

6. The combination set forth in claim 5 in which the reservoir has a strap member near its upper end with ears against the engine side of the dashboard and in which bolts through the dashboard secure both the ears of said strap and the base of said bracket in position.

7. A supply installation for a chassis lubricating system, said installation including a reservoir, a pump cylinder mounted in the lower part thereof, and extending obliquely upward therefrom, means attaching said reservoir to the front of the dashboard, said means including lugs near the upper end of the reservoir, bolts through the dashboard clamping said lugs against the dashboard and a cylinder sustaining bracket attached at one end to the outboard end of the cylinder and clamped at its other end against said dashboard by said bolts.

Signed at New York city in the county of New York and State of New York April A. D. 1927.

JOSEPH BIJUR.